United States Patent

Kawai

(10) Patent No.: US 6,331,829 B2
(45) Date of Patent: *Dec. 18, 2001

(54) DECODING DEVICE AND METHOD

(75) Inventor: Takahiro Kawai, Tokyo (JP)

(73) Assignee: Mitsubishi Denki Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/436,250

(22) Filed: Nov. 9, 1999

(30) Foreign Application Priority Data

Jul. 2, 1999 (JP) .................................................. 11-189103

(51) Int. Cl.$^7$ .................................................. H03M 13/00
(52) U.S. Cl. ............................................. 341/94; 714/776
(58) Field of Search .............................. 341/94, 50, 143; 348/473; 369/275; 375/240, 259; 382/232; 386/106, 95, 96; 714/776

(56) References Cited

U.S. PATENT DOCUMENTS

| | | | | |
|---|---|---|---|---|
| 5,644,310 | * | 7/1997 | Laczko et al. | 341/143 |
| 5,953,375 | * | 9/1999 | Nishiwaki et al. | 375/259 |
| 6,141,385 | * | 10/2000 | Yamaji | 375/240 |

FOREIGN PATENT DOCUMENTS 8-251146    9/1996    (JP) .

* cited by examiner

*Primary Examiner*—Patrick Wamsley
(74) *Attorney, Agent, or Firm*—Burns, Doane, Swecker & Mathis, LLP

(57) ABSTRACT

There is provided a decoding device comprising a unit for checking whether an error occurs in pack header information which is extracted from each pack by a pack header information extracting unit, for retrieving pack header information that mostly conforms to a specific standard from a pack header information database if the extracted pack header information has an error, and for replacing the extracted pack header information having an error with the pack header information that mostly conforms to the specific standard to enable a packet header detecting unit to detect the packet header.

11 Claims, 8 Drawing Sheets

DECODING DEVICE AND METHOD

BACKGROUND OF THE INVENTION

1. Field of the Invention

The present invention relates to a decoding device and method for receiving bitstreams including coded, multiplexed video, audio, and so on, and extracting coded data from each bitstream to decode the coded data.

2. Description of the Prior Art

When a prior art decoding device decodes an input bitstream, including coded, multiplexed data, such as video, audio, and so on, the bitstream forming a hierarchy comprised of packs, each of which is high-level information, and packets, each of which is low-level information, it detects a pack header from each pack and then detects a packet header based on pack header information included in the pack header detected. At that time, the prior art decoding device can detect errors in the pack header information, such as a stuffing length or a pack header length, within the pack header, and then detect the packet header only when there is no error in the pack header information. The prior art decoding device then detects packet header information from the packet header, and also tries to detect errors in the packet header information, such as a stuffing length and a packet header length, within the packet header. Only when there is no error in the packet header information, the prior art decoding device separates a coded data region from each packet included in the bitstream, including coded, multiplexed data, such as video, audio and so on, and then extracts coded data from the coded data region.

In addition, when the coded data region separated includes a private data other than the coded data, which is information associated with the coded data, the prior art decoding device tries to detect errors in the private data and then decodes the coded data only when there in no error in the private data.

In an audio information coding system which conforms to a DVD-Video standard, such as Dolby digital, linear PCM, or MPEG audio, the private data other than the coded data, which is information associated with coded data, is a coded data placed and multiplexed as a private stream packet in the coded data region. For example, the private data can be either audio frame information indicating the number of audio frames within each packet or audio data information indicating the number of audio channels.

Japanese Patent Application Publication No. 8-251146 discloses another prior art decoding device that can send an error detection result including a resend requirement, as a response packet, to the sender when it detects an error in a data packet included in another input bitstream, and then replace the data having an error with a data that is resent thereto.

A problem with prior art decoding devices constructed as above is that if the pack header information within each pack header includes an error, the packet header cannot be detected and an error process is carried out even though the packet data hierarchically arranged in each pack does not include any errors and the coded data is correct. Further, an error detection in the packet header information triggers an error process and hence prevents the coded data from being decoded even though the pack header information does not include any errors and the coded data is correct. In addition, an error detection in information associated with the coded data, other than the coded data, which is placed in the coded data region of each packet, prevents the coded data from being decoded even though any one of the coded data, pack header information, and packet header information does not include any errors.

SUMMARY OF THE INVENTION

The present invention is made to overcome the above problem. It is therefore an object of the present invention to provide a decoding device and method, for checking or determining whether either pack or packet header information or information associated with coded data within each pack included in each bitstream has an error, for changing the checked information with valid one without carrying out an error process if it is determined that the checked information has an error, and for separating the coded data from each pack included in each bitstream and decoding the coded data.

In accordance with one aspect of the present invention, there is provided a decoding device for extracting coded data from a sequence of data that forms a hierarchy in which each of a plurality of packs includes at least a packet and each packet includes coded data within a coded data region thereof, the device comprising: a pack header detecting unit for detecting a pack header placed at the head of each of the plurality of packs; a pack header information extracting unit for extracting pack header information contained in the pack header detected by the pack header detecting unit; a pack header information database for storing at least a piece of reference pack header information that conforms to a specific standard; a packet header detecting unit for detecting a packet header placed at the head of each packet contained in each of the plurality of packs based on the pack header information extracted by the pack header information extracting unit; a unit for checking whether an error occurs in the pack header information extracted by the pack header information extracting unit, for retrieving a piece of reference pack header information that mostly conforms to the specific standard from the pack header information database if the extracted pack header information has an error, and for replacing the extracted pack header information having an error with the reference pack header information that mostly conforms to the specific standard to enable the packet header detecting unit to detect the packet header; a packet header information extracting unit for extracting packet header information contained in the packet header; a coded data extracting unit for separating a coded data region from each packet based on the packet header information extracted by the packet header information extracting unit, and for extracting coded data from the coded data region; and a decoding unit for decoding the coded data extracted by the coded data extracting unit.

In accordance with a preferred embodiment of the present invention, the decoding device further comprises: a packet header information database for storing at least a piece of reference packet header information that conforms to the specific standard; and a unit for checking whether an error occurs in the packet header information extracted by the packet header information extracting unit, for retrieving a piece of reference packet header information that mostly conforms to the specific standard from the packet header information database if the extracted packet header information has an error, and for replacing the extracted packet header information having an error with the reference packet header information that mostly conforms to the specific standard to enable the coded data extracting unit to extract the coded data.

As an alternative, the decoding device further comprises: a coded-data-specific information extracting unit for extracting coded-data-specific information other than the coded data, which is associated with the coded data, from the coded data region separated by the coded data extracting unit; a coded-data-specific information database for storing at least a piece of reference coded-data-specific information that conforms to the specific standard; and a unit for checking whether an error occurs in the coded-data-specific information extracted by the coded-data-specific information extracting unit, for retrieving a piece of reference coded-data-specific information that mostly conforms to the specific standard from the coded-data-specific information database if the extracted coded-data-specific information has an error, and for replacing the extracted coded-data-specific information having an error with the reference coded-data-specific information that mostly conforms to the specific standard to enable the decoding unit to decode the coded data.

In accordance with another preferred embodiment of the present invention, the decoding device further comprises: a packet header information database for storing at least a piece of reference packet header information that conforms to the specific standard; a unit for checking whether an error occurs in the packet header information extracted by the packet header information extracting unit, for retrieving a piece of reference packet header information that mostly conforms to the specific standard from the packet header information database if the extracted packet header information has an error, and for replacing the extracted packet header information having an error with the reference packet header information that mostly conforms to the specific standard to enable the coded data extracting unit to extract the coded data; a coded-data-specific information extracting unit for extracting coded-data-specific information other than the coded data, which is associated with the coded data, from the coded data region separated by the coded data extracting unit; a coded-data-specific information database for storing at least a piece of reference coded-data-specific information that conforms to the specific standard; and a unit for checking whether an error occurs in the coded-data-specific information extracted by the coded-data-specific information extracting unit, for retrieving a piece of reference coded-data-specific information that mostly conforms to the specific standard from the coded-data-specific information database if the extracted coded-data-specific information has an error, and for replacing the extracted coded-data-specific information having an error with the reference coded-data-specific information that mostly conforms to the specific standard to enable the decoding unit to decode the coded data.

In accordance with another aspect of the present invention, there is provided a decoding device for extracting coded data from a sequence of data that forms a hierarchy in which each of a plurality of packs includes at least a packet and each packet includes coded data within a coded data region thereof, the device comprising: a pack header detecting unit for detecting a pack header placed at the head of each of the plurality of packs; a pack header information extracting unit for extracting pack header information contained in the pack header detected by the pack header detecting unit; a packet header detecting unit for detecting a packet header placed at the head of each packet contained in each of the plurality of packs based on the pack header information extracted by the pack header information extracting unit; a packet header information extracting unit for extracting packet header information contained in the packet header; a packet header information database for storing at least a piece of reference packet header information that conforms to a specific standard; a coded data extracting unit for separating a coded data region from each packet based on the packet header information extracted by the packet header information extracting unit, and for extracting coded data from the coded data region; a unit for checking whether an error occurs in the packet header information extracted by the packet header information extracting unit, for retrieving a piece of reference packet header information that mostly conforms to the specific standard from the packet header information database if the extracted packet header information has an error, and for replacing the extracted packet header information having an error with the reference packet header information that mostly conforms to the specific standard to enable the coded data extracting unit to extract the coded data; and a decoding unit for decoding the coded data extracted by the coded data extracting unit.

Preferably, the decoding device further comprises a coded-data-specific information extracting unit for extracting coded-data-specific information other than the coded data, which is associated with the coded data, from the coded data region separated by the coded data extracting unit; a coded-data-specific information database for storing at least a piece of reference coded-data-specific information that conforms to the specific standard; and a unit for checking whether an error occurs in the coded-data-specific information extracted by the coded-data-specific information extracting unit, for retrieving a piece of reference coded-data-specific information that mostly conforms to the specific standard from the coded-data-specific information database if the extracted coded-data-specific information has an error, and for replacing the extracted coded-data-specific information having an error with the reference coded-data-specific information that mostly conforms to the specific standard to enable the decoding unit to decode the coded data.

In accordance with another aspect of the present invention, there is provided a decoding device for extracting coded data from a sequence of data that forms a hierarchy in which each of a plurality of packs includes at least a packet and each packet includes coded data within a coded data region thereof, the device comprising: a pack header detecting unit for detecting a pack header placed at the head of each of the plurality of packs; a pack header information extracting unit for extracting pack header information contained in the pack header detected by the pack header detecting unit; a packet header detecting unit for detecting a packet header placed at the head of each packet contained in each of the plurality of packs based on the pack header information extracted by the pack header information extracting unit; a packet header information extracting unit for extracting packet header information contained in the packet header; a coded data extracting unit for separating a coded data region from each packet based on the packet header information extracted by the packet header information extracting unit, and for extracting coded data from the coded data region; a coded-data-specific information extracting unit for extracting coded-data-specific information other than the coded data, which is associated with the coded data, from the coded data region separated by the coded data extracting unit; a coded-data-specific information database for storing at least a piece of reference coded-data-specific information that conforms to a specific standard; a decoding unit for decoding the coded data extracted by the coded data extracting unit; and a unit for checking whether an error occurs in the coded-data-specific information extracted by the coded-data-specific information extracting unit, for retrieving a piece of reference coded-data-specific information that mostly conforms to the specific standard from the coded-data-specific information database if the extracted coded-data-specific information has an error, and for replacing the extracted coded-data-specific information having an error with the reference coded-data-specific information that mostly conforms to the specific standard to enable the decoding unit to decode the coded data.

In accordance with another aspect of the present invention, there is provided a decoding method of extracting coded data from a sequence of data that forms a hierarchy in which each of a plurality of packs includes at least a packet and each packet includes coded data within a coded data region thereof, the method comprising the steps of: detecting a pack header placed at the head of each of the plurality of packs; extracting pack header information contained in the pack header detected in the pack header detecting step; providing a pack header information database for storing at least a piece of reference pack header information that conforms to a specific standard; detecting a packet header placed at the head of each packet contained in each of the plurality of packs based on the pack header information extracted in the pack header information extracting step; checking whether an error occurs in the pack header information extracted in the pack header information extracting step, for retrieving a piece of reference pack header information that mostly conforms to the specific standard from the pack header information database if the extracted pack header information has an error, and for replacing the extracted pack header information having an error with the reference pack header information that mostly conforms to the specific standard to enable the packet header detecting step; extracting packet header information contained in the packet header; separating a coded data region from each packet based on the packet header information extracted in the packet header information extracting step, and extracting coded data from the coded data region; and decoding the coded data extracted in the coded data extracting step.

In accordance with another aspect of the present invention, there is provided a decoding method for extracting coded data from a sequence of data that forms a hierarchy in which each of a plurality of packs includes at least a packet and each packet includes coded data within a coded data region thereof, the method comprising the steps of: detecting a pack header placed at the head of each of the plurality of packs; extracting pack header information contained in the pack header detected in the pack header detecting step; detecting a packet header placed at the head of each packet contained in each of the plurality of packs based on the pack header information extracted in the pack header information extracting step; extracting packet header information contained in the packet header; providing a packet header information database for storing at least a piece of reference packet header information that conforms to a specific standard; separating a coded data region from each packet based on the packet header information extracted in the packet header information extracting step, and extracting coded data from the coded data region; checking whether an error occurs in the packet header information extracted in the packet header information extracting step, for retrieving a piece of reference packet header information that mostly conforms to the specific standard from the packet header information database if the extracted packet header information has an error, and for replacing the extracted packet header information having an error with the reference packet header information that mostly conforms to the specific standard to enable the coded data extracting step; and decoding the coded data extracted in the coded data extracting step.

In accordance with another aspect of the present invention, there is provided a decoding method of extracting coded data from a sequence of data that forms a hierarchy in which each of a plurality of packs includes at least a packet and each packet includes coded data within a coded data region thereof, the method comprising the steps: detecting a pack header placed at the head of each of the plurality of packs; extracting pack header information contained in the pack header detected in the pack header detecting step; detecting a packet header placed at the head of each packet contained in each of the plurality of packs based on the pack header information extracted in the pack header information extracting step; extracting packet header information contained in the packet header; separating a coded data region from each packet based on the packet header information extracted in the packet header information extracting step, and extracting coded data from the coded data region; extracting coded-data-specific information other than the coded data, which is associated with the coded data, from the coded data region separated in the coded data region separating step; providing a coded-data-specific information database for storing at least a piece of reference coded-data-specific information that conforms to a specific standard; decoding the coded data extracted in the coded data extracting step; and checking whether an error occurs in the coded-data-specific information extracted in the coded-data-specific information extracting step, retrieving a piece of reference coded-data-specific information that mostly conforms to the specific standard from the coded-data-specific information database if the extracted coded-data-specific information has an error, and replacing the extracted coded-data-specific information having an error with the reference coded-data-specific information that mostly conforms to the specific standard to enable the decoding step to decode the coded data.

Further objects and advantages of the present invention will be apparent from the following description of the preferred embodiments of the invention as illustrated in the accompanying drawings.

DETAILED DESCRIPTION OF THE PREFERRED EMBODIMENTS

First Embodiment

Figure 1:
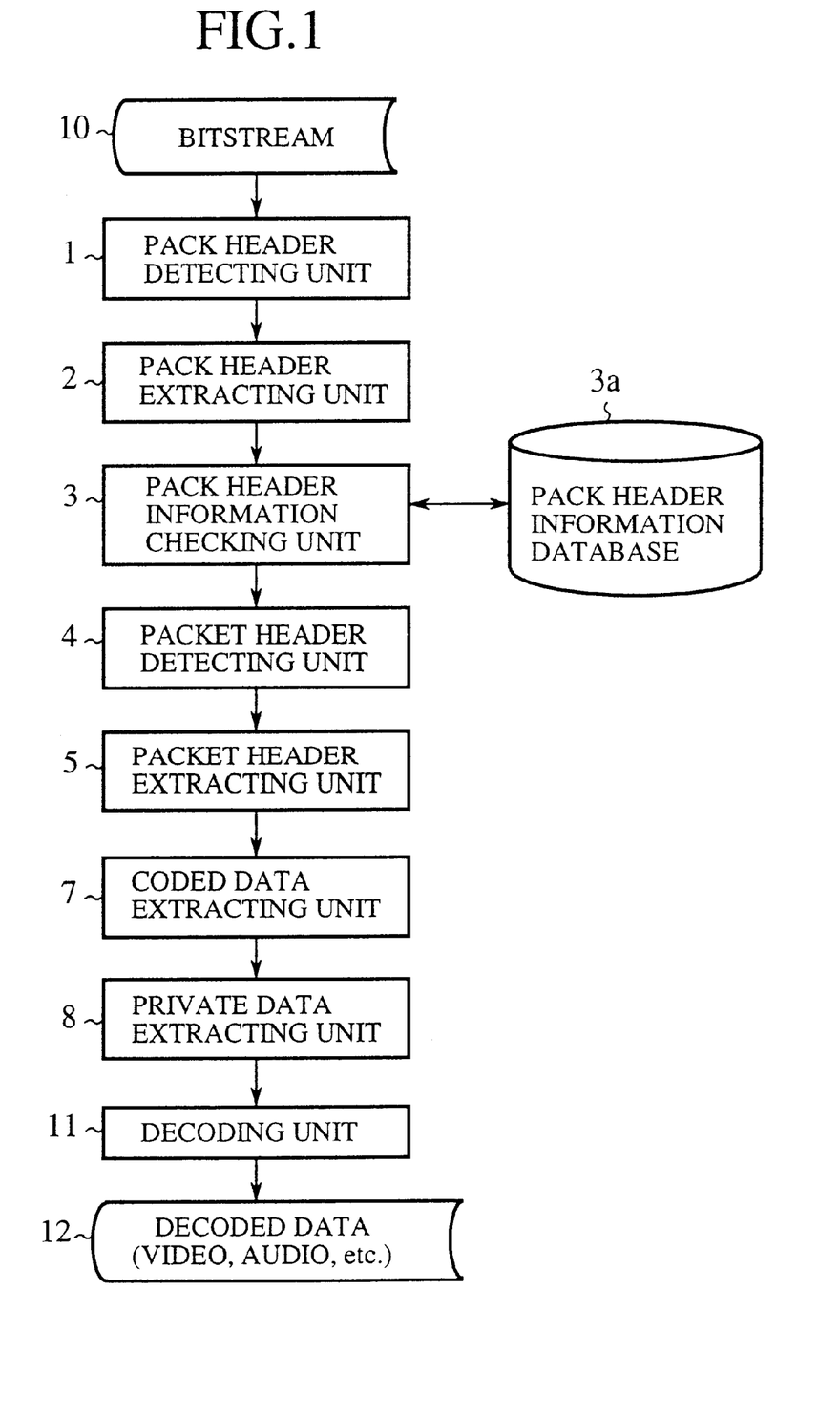
FIG. 1 is a block diagram showing the structure of a decoding device according to a first embodiment of the present invention.

Referring next to FIG. 1, there is illustrated a block diagram showing the structure of a decoding device according to a first embodiment of the present invention. In the figure, reference numeral 1 denotes a pack header detecting unit for detecting each pack header from an input bitstream 10 including coded, multiplexed data, such as video, audio, and so on, 2 denotes a pack header extracting unit for extracting pack header information from each pack header detected by the pack header detecting unit 1, and 3 denotes a pack header information checking unit for checking whether the pack header information extracted by the pack header extracting unit 2 conforms to a specific standard, that is, checking the validity of the extracted pack header information, for selectively reading or retrieving a piece of reference pack header information that mostly conforms to the specific standard from a pack header information database 3a if an error occurs in the pack header information, and for replacing the pack header information having an error with the reference pack header information retrieved from the pack header information database 3a.

Further, reference numeral 4 denotes a packet header detecting unit for detecting a packet header based on the packet header information extracted by the packet header extracting unit 2, 5 denotes a packet header extracting unit for extracting packet header information from the packet header detected by the packet header detecting unit 4, 7 denotes a coded data extracting unit for separating a coded data region from the detected packet based on the packet header information extracted by the packet header extracting unit 5 and for extracting coded data from the coded data region, and 8 denotes a private data extracting unit for, if the coded data region includes private data other than the coded data, which is information associated with the coded data, extracting the private data from the coded data region separated by the coded data extracting unit 7.

Figure 8:
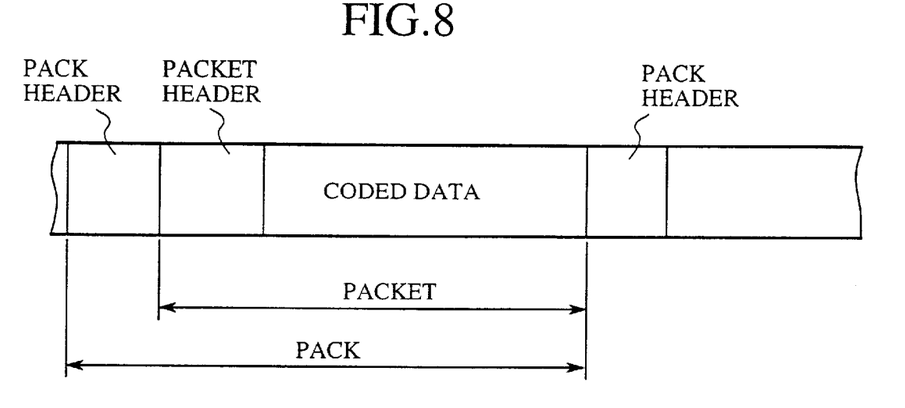
FIG. 8 is a diagram showing the structure of an example of a bitstream to be decoded.

Reference numeral 11 denotes a decoding unit for decoding the coded data extracted by the coded data extracting unit 7, and 12 denotes decoded data, such as video, audio, or the like, which has been decoded by the decoding unit 11. The bitstream 10 is a coded signal, including coded, multiplexed video, audio, and so on, to be decoded by the decoding device of the present invention. The bitstream 10 has a hierarchy, as shown in FIG. 8, in which each pack that is a high-level information unit contains a packet that is a low-level information unit. Each pack includes a pack header, in which pieces of information, such as a pack start code, a system clock reference or SCR, a rate of multiplexing, a staffing length, a staffing byte, and so on, are stored at the head of each pack. Each pack also includes a packet having a packet header, in which pieces of information, such as a packet start code, a packet length, and so on, are stored at the head of the packet.

Figure 9:
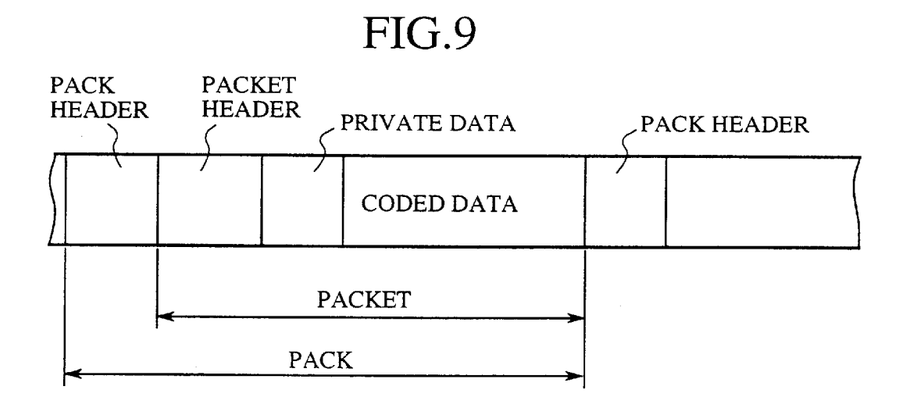
FIG. 9 is a diagram showing the structure of another example of a bitstream to be decoded.
Figure 10:
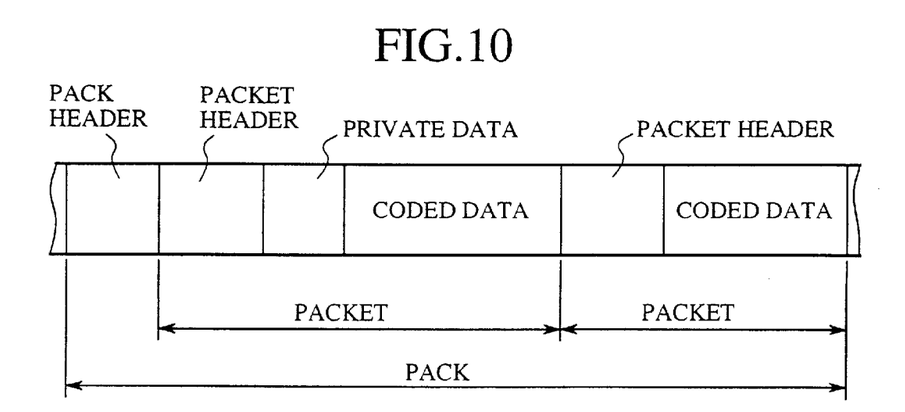
FIG. 10 is a diagram showing the structure of another example of a bitstream to be decoded.

Each pack can have a stream structure, as shown in FIG. 9, in which each pack contains both coded data and a private data. The private data can be information indicating either the number of data frames included in each packet or the number of channels. In the example as shown in FIG. 9, each pack includes only a packet. As an alternative, each pack can include a plurality of packets as shown in FIG. 10.

Figure 2:
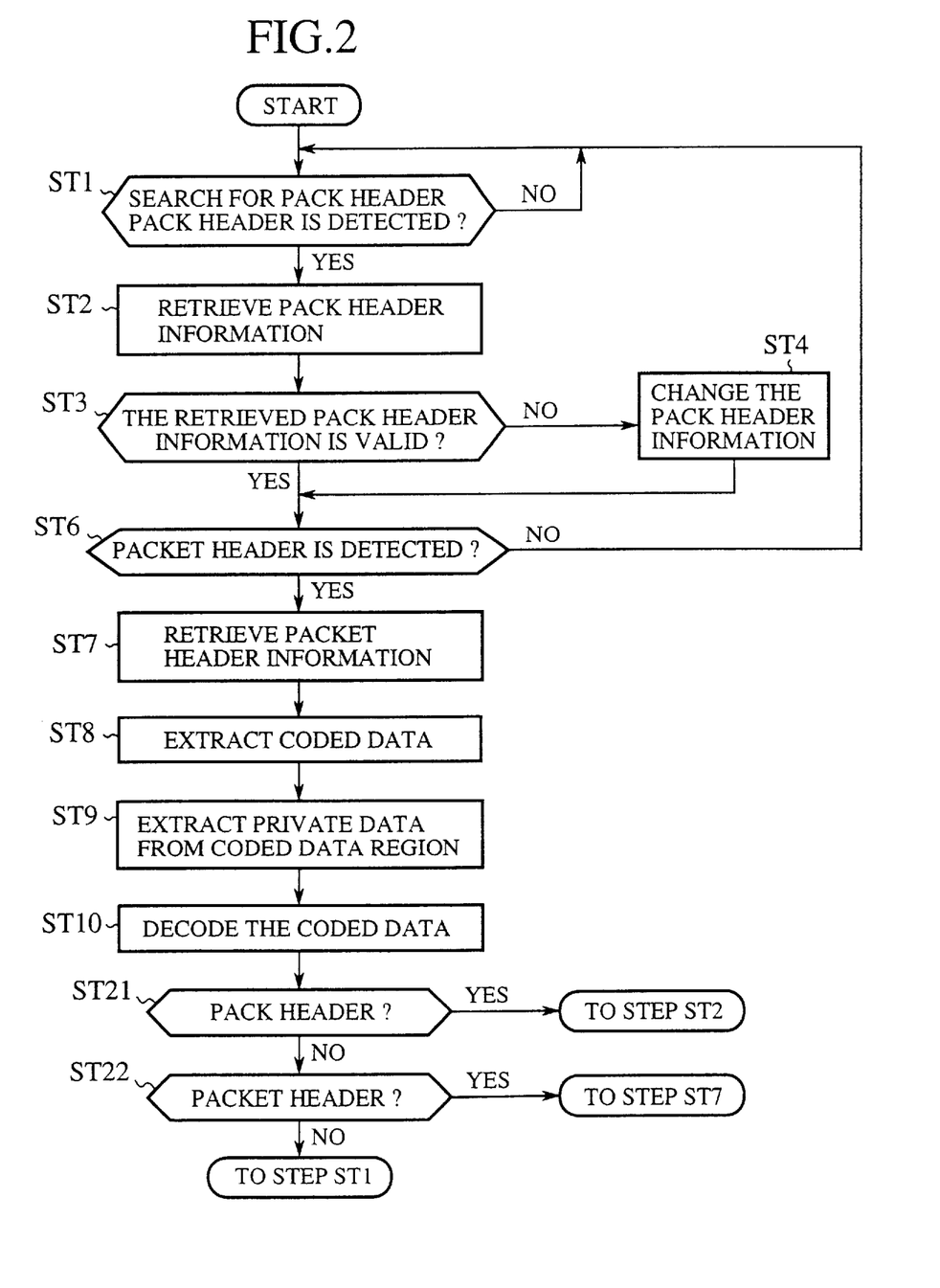
FIG. 2 is a flow diagram showing the operation of the decoding device according to the first embodiment of the present invention in the case of decoding a bitstream that conforms to a DVD-Video standard.

Referring next to FIG. 2, there is illustrated a flow diagram showing the operation of the decoding device according to the first embodiment of the present invention. First, the decoding device receives a bitstream 10, including coded, multiplexed data, such as video, audio, and so on, by way of a bitstream input unit not shown. The pack header detecting unit 1 then, in step ST1, searches for a pack header placed at the head of each pack within the bitstream 10, and repeats the searching process until it can detect the pack header. When the pack header detecting unit 1 detects the pack header, the pack deader extracting unit 2, in step ST2, extracts pack header information, as mentioned above, from the pack header.

The pack header information checking unit 3 then, in step ST3, checks whether an error occurs in the extracted pack header information. The error checking process can be implemented by checking the validity of the extracted pack header information, i.e., determining whether the extracted pack header information conforms to a specific standard. To be more specific, the pack header information checking unit 3 checks whether a data included in the pack header information matches up with a certain value defined by the specific standard, such as a DVD-Video standard. For example, the pack header information checking unit 3 checks whether the stuffing length contained in the pack header information has a predetermined value defined by the specific standard.

If the checking result by the pack header information checking unit 3 shows that no error occurs in the pack header information, the packet header detecting unit 4, in step ST6, tries to detect a packet header based on the pack header information. In contrast, if the checking result by the pack header information checking unit 3 shows that an error occurs in the pack header information (e.g., the extracted stuffing length does not match up with a certain value defined by the specific standard), the pack header information checking unit 3, in step ST4, selectively reads or retrieves a piece of reference pack header information that mostly conforms to the specific standard from the pack header information database 3a, and replaces the pack header information having an error with the reference pack header information retrieved from the pack header information database 3a.

The replacing process will be explained more concretely. For example, in the DVD-Video standard, the stuffing length within the pack header information is defined as 0. Therefore, after the pack header information checking unit 3 checks whether or not the stuffing length contained in the pack header information is 0, in order to check the validity of the pack header information, the pack header information checking unit 3 replaces the extracted stuffing length with a piece of reference pack header information having the predetermined value, i.e., 0, which is stored in the pack header information database 3a, if it determines that the extracted stuffing length has an error. In the DVD-Video standard, since the most significant bit of SCR is defined as 0 and the transfer rate is defined as 10.08 Mbps, the pack header information checking unit 3 can check whether either the most significant bit of SCR or the transfer rate, instead of the stuffing length, contained in the pack header information has a predetermined value in order to determine the validity of the pack header information. If the pack header information checking unit 3 determines that an error occurs in either the most significant bit of SCR or the transfer rate, it changes either of them so that either of them has its typical value that mostly meets the DVD-Video standard.

After the pack header information checking unit 3 changes the extracted pack header information so that it mostly conforms to the DVD-Video standard, the packet header detecting unit 4, in step ST6, tries to detect the packet header based on the error-checked (or error-corrected) pack header information. If the packet header detecting unit 4 cannot detect the packet header, the decoding device then returns to step ST1 wherein the pack header detecting unit 1 tries to detect the next pack header. In contrast, when the packet header detecting unit 4 succeeds in detecting the packet header, the packet header extracting unit 5, in step ST7, extracts the packet header information from the packet header. The coded data extracting unit 7 then, in step ST8, separates the coded data region from the packet and extracts the coded data.

Figure 3:
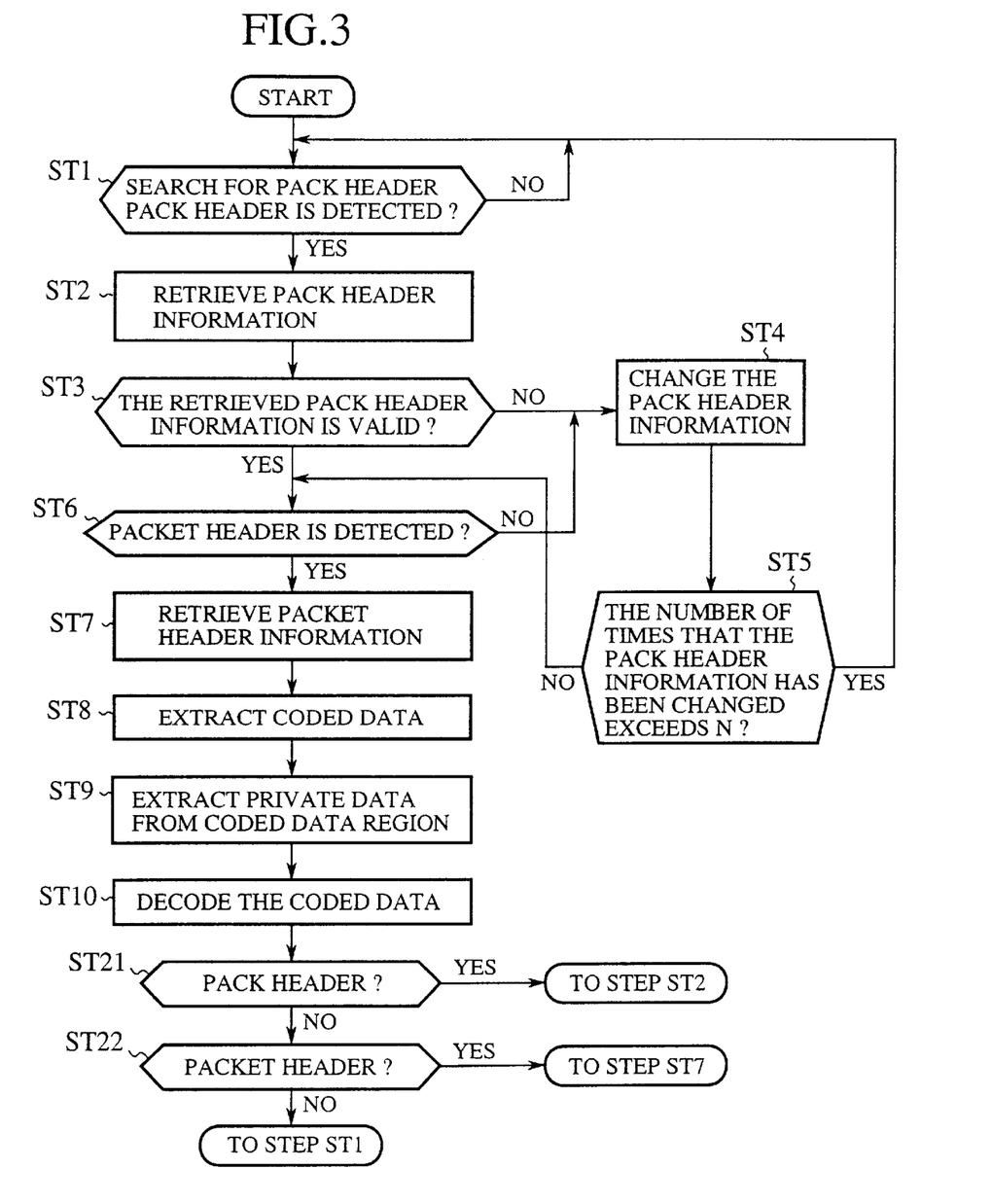
FIG. 3 is a flow diagram showing the operation of the decoding device according to the first embodiment of the present invention in the case of decoding a bitstream that conforms to an MPEG standard.

Referring next to FIG. 3, there is illustrated a flow diagram showing the operation of the decoding device according to the first embodiment of the present invention in the case that a bitstream to be decoded conforms to an MPEG standard. In the case of decoding a bitstream that conforms to the MPEG standard, the pack header information database 3a stores a plurality of pieces of reference pack header information that conform to the MPEG standard. In this case, the pack header information database 3a can also include at least a piece of reference pack header information that conforms to the DVD-Video standard. In the MPEG standard, the staffing length contained in the pack header information has a maximum value of 7. The pack header information checking unit 3 thus, in step ST4, replaces the extracted stuffing length having an error with a reference stuffing length retrieved from the pack header information database 3a, the reference stuffing length being in the range of 0 to 7, when the pack header information checking unit 3 determines that the extracted stuffing length contained in the pack header information has an error. For example, when the pack header information checking unit 3 needs to change the stuffing length for the first time, it replaces the stuffing length with 0. After that, when the pack header information checking unit 3 needs to change the stuffing length for the second, third, fourth, fifth, sixth, seventh, or eighth time, it will replace the current stuffing length with 1, 2, 3, 4, 5, 6, or 7.

After the pack header information checking unit 3 has changed the extracted pack header information so that it conforms to the MPEG standard, in step ST4, the pack header information checking unit 3, in step ST5, checks whether the number of times that the pack header information checking unit 3 has changed the pack header information (e.g., the stuffing length) exceeds a predetermined number N, 8 in the case of the stuffing length. Unless the number of times that the pack header information (e.g., the stuffing length) has been replaced with a reference stuffing length stored in the pack header information database 3a exceeds N, the pack header information checking unit 3, in step ST6, enables the packet header detecting unit 4 to detect the packet header based on the pack header information. For example, when the stuffing length in the packet header information has a value that mostly meets the MPEG standard after it has been replaced or changed once or several times, the packet header detecting unit 4 may detect the packet header. If the number of times that the pack header information (e.g., the stuffing length) has been changed, however, exceeds N, the pack header information checking unit 3 determines that the packet header detecting unit 4 could not detect the packet header even though the stuffing length in the packet header information has been changed the predetermined number of times N. The decoding device then returns to step ST1 wherein the pack header detecting unit 1 tries to detect the next pack header.

The packet header detecting unit 4, in step ST6, tries to detect the packet header based on the error-checked (or error-corrected) pack header information. At that time, if the packet header detecting unit 4 cannot detect the packet header, it determines that the error-checked pack header information still includes an error. The decoding device then returns to step ST4 wherein the pack header checking unit 3 changes the pack header information. In contrast, when the packet header detecting unit 4 succeeds in detecting the packet header, the packet header extracting unit 5, in step ST7, extracts the packet header information from the packet header. The coded data extracting unit 7 then, in step ST8, separates the coded data region from the packet and extracts the coded data.

In either of the above-mentioned two cases of FIGS. 2 and 3, when the input bitstream 10 further includes private data (or information associated with the coded data) other than the coded data within the coded data region of the packet, as shown in FIGS. 9 and 10, the private data extracting unit 8 extracts the private data from the packet. After that, the decoding device advances to step ST10 in which the decoding unit 11 decodes the coded data extracted by the coded data extracting unit 7 to generate decoded data. The decoding unit 11 then, in step ST21, determines whether or not the next data is a pack header. If the next data is a pack header (in the case of a bitstream structured as shown in FIG. 9), the decoding device returns to step ST2 and then repeats the above-mentioned processes in and after step ST2. Unless the next data is a pack header, the decoding unit 11 then, in step ST22, determines whether or not the next data is a packet header. If the next data is a packet header (in the case of a bitstream structured as shown in FIG. 10), the decoding device returns to step ST7 and then repeats the above-mentioned processes in and after step ST7. Unless the next data is a packet header in performing step ST22, the decoding device returns to step ST1 in which it performs the pack header searching process, and, after that, it repeats the other processes in and after step ST2.

As previously mentioned, in accordance with the first embodiment of the present invention, the decoding device checks whether an error occurs in the extracted pack header information, retrieves a piece of reference pack header information that mostly conforms to a specific standard from the pack header information database 3a if the extracted pack header information has an error, replaces the extracted pack header information having an error with the reference pack header information that mostly meets the specific standard, and then detects the packet header. Accordingly, even though the extracted pack header information has an error, the decoding device can process the input bitstream in the same way that it processes the input bitstream when the pack header information does not include any errors unless an error occurs in data other than the pack header information. The first embodiment thus offers an advantage of being able to prevent an error in the pack header information from making it impossible to decode the coded data even though the coded data does not have any errors.

Second Embodiment

In accordance with a second embodiment of the present invention, there is provided a decoding device that can retrieve a piece of reference packet header information which takes the place of packet header information extracted from each packet and which mostly conforms to a specific standard from a packet header information database 6a if an error occurs in the extracted packet header information, then replace the extracted packet header information having an error with the reference packet header information that mostly meets the specific standard, and perform subsequent processes, in addition to, when an error occurs in the pack header information extracted from each pack, retrieving a piece of reference pack header information which takes the place of the extracted pack header information and which mostly conforms to the specific standard from a pack header information database 3a, replacing the extracted pack header information having an error with the reference pack header information that mostly meets the specific standard, and, performing subsequent processes.

Figure 4:
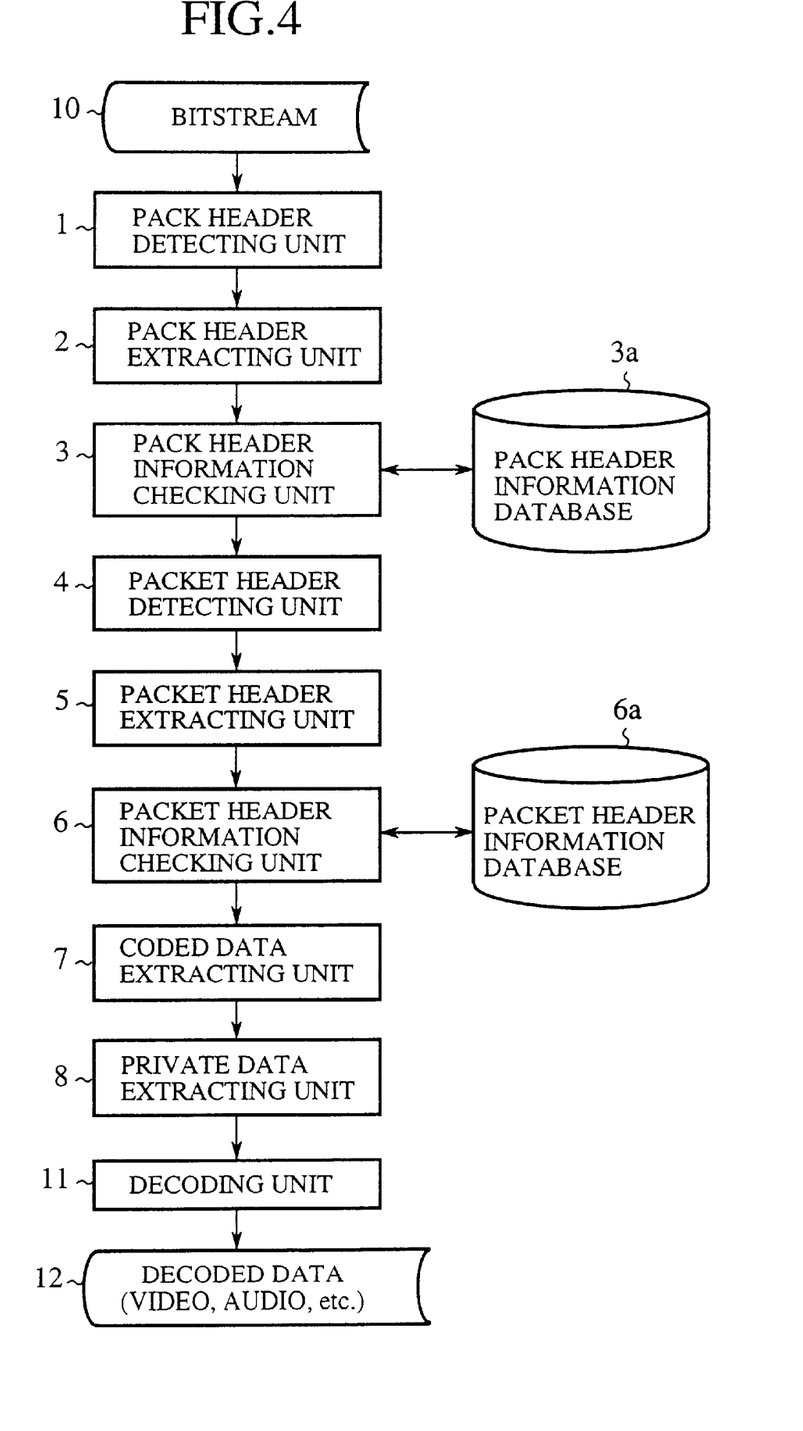
FIG. 4 is a block diagram showing the structure of a decoding device according to a second embodiment of the present invention.

Referring next to FIG. 4, there is illustrated a block diagram showing the structure of the decoding device according to the second embodiment of the present invention. In the figure, reference numeral 6 denotes a packet header information checking unit for checking whether the packet header information extracted by a packet header extracting unit 2 conforms to a specific standard. The packet header information database 6a stores at least a piece of reference packet header information that conforms to the specific standard. The same components as those of the decoding device according to the aforementioned first embodiment are designated by the same reference numerals as shown in FIG. 1, and therefore the description of the components will be omitted hereinafter.

Figure 5:
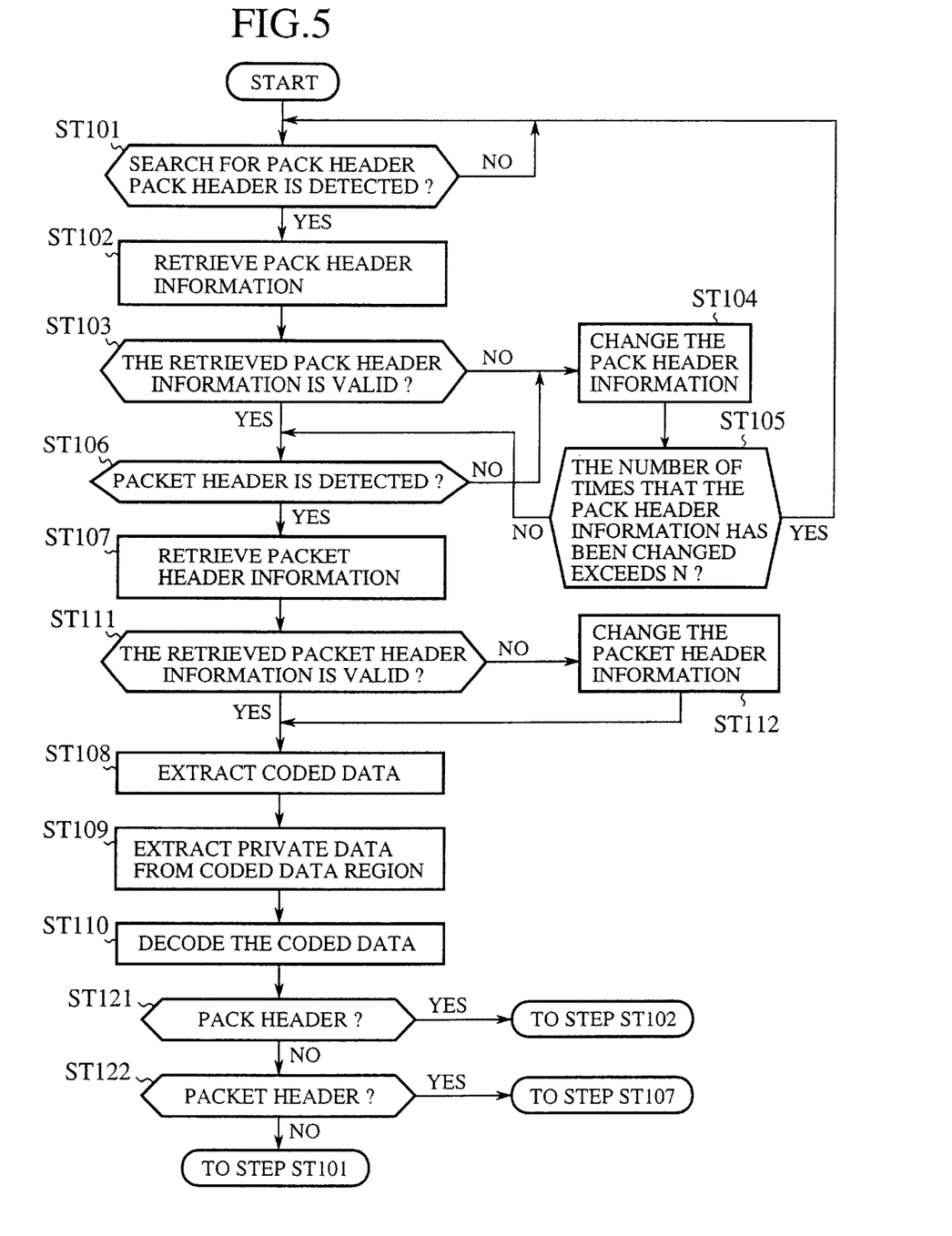
FIG. 5 is a flow diagram showing the operation of the decoding device according to the second embodiment of the present invention.

Referring next to FIG. 5, there is illustrated a flow diagram showing the operation of the decoding device of the second embodiment. The pack header information checking unit 3 checks whether an error occurs in the pack header information extracted by the pack header information extracting unit 2. If the extracted pack header information has an error, the pack header information checking unit 3 reads or retrieves a piece of reference pack header information that mostly conforms to the specific standard from the pack header information database 3a, and then replaces the extracted pack header information having an error with the reference pack header information retrieved from the pack header information database 3a. Since the checking and replacing processes in steps ST101 to ST106 are the same as those in ST1 to ST6, as shown in FIG. 3, of the decoding device of the aforementioned first embodiment, the detailed description of the processes will be omitted hereinafter.

The packet header extracting unit 5, in step ST107, extracts packet header information from the packet header which has been detected, based on the pack header information error-checked and changed as needed by the pack header information checking unit 3, by the pack header detecting unit 4. The packet header information checking unit 6 then, in step ST111, checks whether an error occurs in the packet header information extracted by the packet header extracting unit 5. The error checking can be implemented by determining whether the extracted packet header information conforms to the specific standard. To be more specific, the packet header information checking unit 6 checks whether a data included in the packet header information matches up with a certain value defined by the specific standard such as the DVD-Video standard. For example, the packet header information checking unit 6 checks whether either the stuffing length or the packet header length contained in the packet header information has a predetermined value defined by the specific standard.

If the checking result by the packet header information checking unit 6 shows that no error occurs in the packet header information, a coded data extracting unit 7, in step ST108, separates the coded data region from the packet and then extracts the coded data from the coded data region. In contrast, if the checking result by the packet header information checking unit 6 shows that an error occurs in the packet header information (e.g., either the stuffing length or packet header length within the packet header information does not match up with a predetermined value defined by the specific standard), the packet header information checking unit 6, in step ST112, selectively retrieves a piece of reference packet header information that mostly meets the specific standard from the packet header information database 6a, and replaces the extracted packet header information having an error with the reference packet header information retrieved from the packet header information database 6a. The coded data extracting unit 7, in step ST108, separates the coded data region from the packet based on the packet header information that has taken the place of the extracted packet header information having an error, and then extracts the coded data from the coded data region. The subsequent processes in steps ST109 to ST122 are the same as those in steps ST9 to ST22 of the decoding device of the first embodiment, and therefore the description of those processes will be omitted hereinafter.

As previously mentioned, in accordance with the second embodiment of the present invention, the decoding device checks whether an error occurs in the extracted pack header information, retrieves a piece of reference pack header information that mostly conforms to a specific standard from the pack header information database 3a if the extracted pack header information includes an error, replaces the extracted pack header information having an error with the reference pack header information that mostly meets the specific standard, and tries to detect the packet header. In addition, the decoding device checks whether an error occurs in the extracted packet header information, retrieves a piece of reference packet header information that mostly conforms to the specific standard from the packet header information database 6a if the extracted packet header information has an error, replaces the extracted packet header information having an error with the reference packet header information that mostly meets the specific standard, and separates the coded data region from the packet and then extracts the coded data from the coded data region. Accordingly, even though the extracted packet header information has an error, the decoding device can process the input bitstream in the same way that it processes the input bitstream when the packet header information does not include any errors unless an error occurs in data other than the packet header information. The second embodiment thus offers an advantage of being able to prevent an error in the packet header information from making it impossible to decode the coded data even though the coded data does not have any errors, in addition to offering the same advantage as provided by the aforementioned first embodiment.

Third Embodiment

In accordance with a third embodiment of the present invention, there is provided a decoding device that can read or retrieve a reference private data which takes the place of the private data extracted from the coded data region in each packet and which mostly conforms to a specific standard from a private data database 9a when an error occurs in the extracted private data, then replace the extracted private data having an error with the reference private data that mostly meets the specific standard, and perform subsequent processes, in addition to, when an error occurs in the pack header information extracted from each pack, retrieving a piece of reference pack header information which takes the place of the extracted pack header information and which mostly conforms to the specific standard from the pack header information database 3a, replacing the extracted pack header information having an error with the reference pack header information that mostly meets the specific standard, when an error occurs in the packet header information extracted from each packet, retrieving a piece of reference packet header information which takes the place of the extracted packet header information and which mostly conforms to the specific standard from the packet header information database 6a, replacing the extracted packet header information having an error with the reference packet header information data that mostly meets the specific standard, and, performing subsequent processes.

Figure 6:
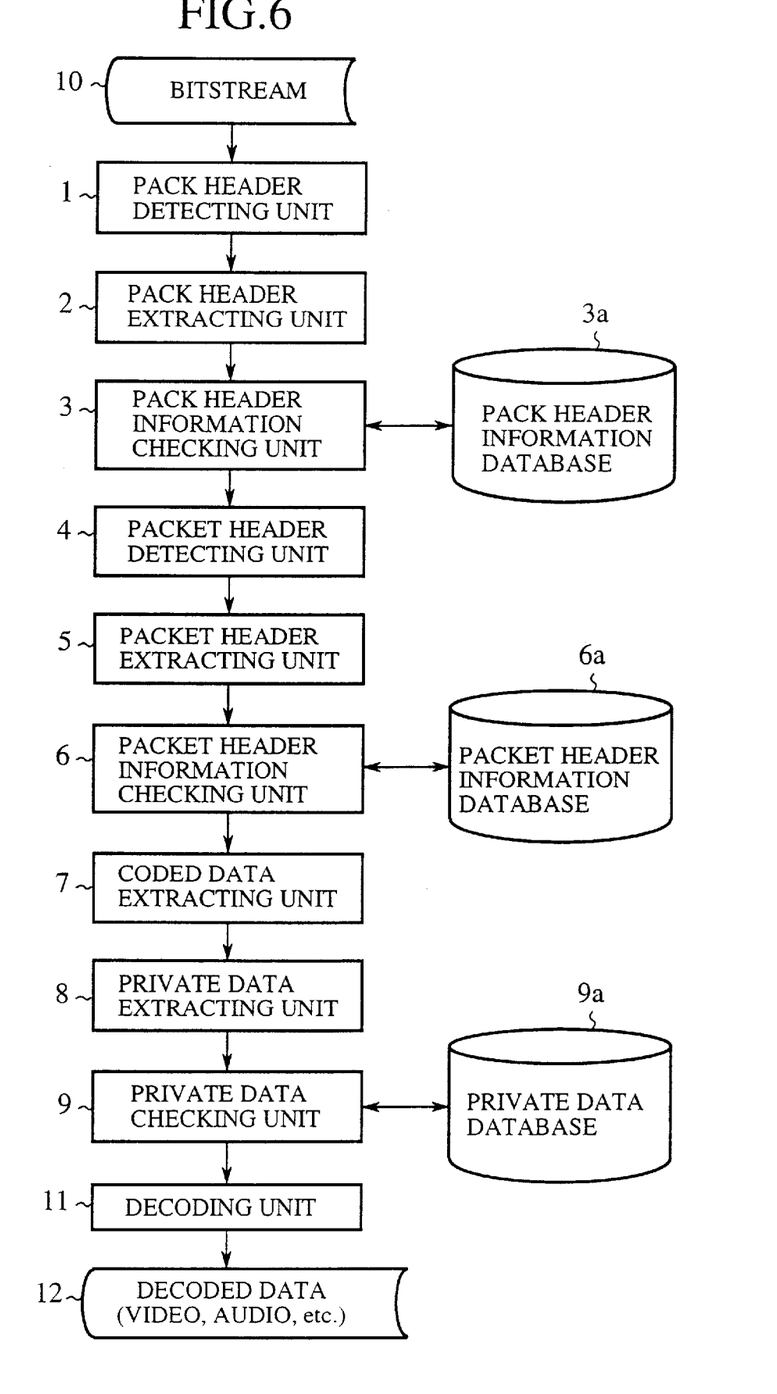
FIG. 6 is a block diagram showing the structure of a decoding device according to a third embodiment of the present invention.

Referring next to FIG. 6, there is illustrated a block diagram showing the structure of the decoding device according to the third embodiment of the present invention. In the figure, reference numeral 9 denotes a private data checking unit for checking whether a private data extracted by a private data extracting unit 8 conforms to a specific standard, that is, checking the validity of the extracted private data. The private data database 9a stores at least a reference private data that conforms to the specific standard. The same components as those of the decoding device according to the aforementioned second embodiment are designated by the same reference numerals as shown in FIG. 2, and therefore the description of the components will be omitted hereinafter.

Figure 7:
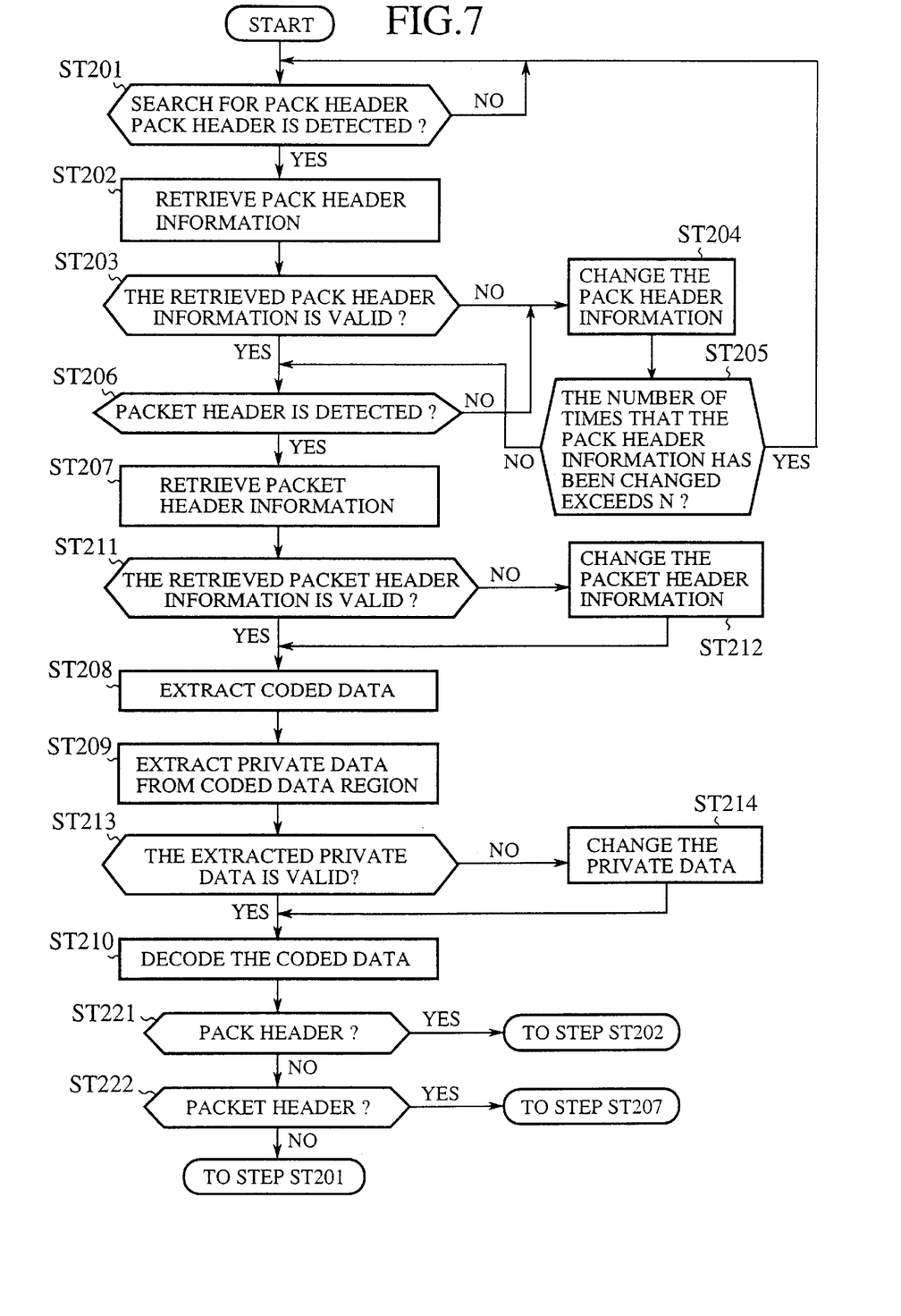
FIG. 7 is a flow diagram showing the operation of the decoding device according to the third embodiment of the present invention.

Referring next to FIG. 7, there is illustrated a flow diagram showing the operation of the decoding device of the third embodiment. The pack header information checking unit 3 checks whether an error occurs in the pack header information extracted by the pack header information extracting unit 2. If the extracted pack header information has an error, the pack header information checking unit 3 retrieves a piece of reference pack header information data that mostly conforms to the specific standard from the pack header information database 3a, and then replaces the extracted pack header information having an error with the reference pack header information retrieved from the pack header information database 3a. Since the checking and replacing processes in steps ST201 to ST206 are the same as those in steps ST1 to ST6, as shown in FIG. 3, of the decoding device of the aforementioned first embodiment, the detailed description of those processes will be omitted hereinafter. The packet header information checking unit 6 checks whether an error occurs in the packet header information extracted by the packet header extracting unit 5. If the extracted packet header information has an error, the packet header information checking unit 6 reads a piece of reference packet header information that mostly conforms to the specific standard from the packet header information database 6a, and then replaces the extracted packet header information having an error with the reference packet header information retrieved from the packet header information database 6a. Since the checking and replacing processes in steps ST207, ST211, and ST212 are the same as those in steps ST107, ST111 and ST112, as shown in FIG. 5, of the decoding device of the aforementioned second embodiment, the detailed description of those processes will be omitted hereinafter.

The coded data extracting unit 7, instep ST208, separates the coded data region from the packet based on the packet header information error-checked and changed as needed by the packet header information checking unit 6. The private data extracting unit 8 then, in step ST209, extracts the private data from the coded data region separated by the coded data extracting unit 7. The private data checking unit 9, in step ST213, checks whether an error occurs in the private data extracted by the private data extracting unit 8. The error checking can be implemented by determining whether the private data extracted conforms to the specific standard. To be more specific, the private data checking unit 9 checks whether a data included in the private data matches up with a certain value defined by the specific standard such as the DVD-Video standard. For example, the private data checking unit 9 checks whether or not the number of audio frame headers contained in the private data is equal to a predetermined value defined by the specific standard.

If the checking result by the private data checking unit 9 shows that no error occurs in the private data, a decoding unit 11, in step ST210, decodes the coded data extracted by the coded data extracting unit 7 based on the private data. In contrast, if the checking result by the private data checking unit 9 shows that an error occurs in the private data (e.g., the number of audio frame headers contained in the private data does not match up with a predetermined value defined by the specific standard), the private data checking unit 9, in step ST214, selectively reads a reference private data that mostly conforms to the specific standard from the private data database 9a, and replaces the extracted private data having an error with the reference private data retrieved from the private data database 9a. The decoding unit 11 then, in step ST210, decodes the coded data extracted by the coded data extracting unit 7 based on the private data that has taken the place of the extracted private data having an error. The subsequent processes in steps ST221 and ST222 are the same as those in steps ST121 and ST122, as shown in FIG. 5, of the second embodiment, and therefore the description of those processes will be omitted hereinafter.

As previously mentioned, in accordance with the third embodiment of the present invention, the decoding device checks whether an error occurs in the extracted private data, retrieves a reference private data that mostly conforms to a specific standard from the private data database 9a if the extracted private data has an error, replaces the extracted private data having an error with the reference private data that mostly meets the specific standard, and then decodes the coded data extracted from the coded data region, in addition to performing the same processes as done by the decoding devices according to the first and second embodiments. Accordingly, even though the extracted private data has an error, the decoding device can process the input bitstream in the same way that it processes the input bitstream when the private data does not have any errors unless an error occurs in data other than the private data. The third embodiment thus offers an advantage of being able to prevent an error in the private data from making it impossible to decode the coded data even though the coded data does not include any errors, in addition to offering the same advantages as provided by the aforementioned first and second embodiments.

Many widely different embodiments of the present invention may be constructed without departing from the spirit and scope of the present invention. It should be understood that the present invention is not limited to the specific embodiments described in the specification, except as defined in the appended claims.

What is claimed is:

1. A decoding device for extracting coded data from a sequence of data that forms a hierarchy in which each of a plurality of packs includes at least a packet and each packet includes coded data located within a coded data region thereof, said device comprising:

pack header detecting means for detecting a pack header placed at the head of each of the plurality of packs;

pack header information extracting means for extracting pack header information contained in the pack header detected by said pack header detecting means;

a pack header information database for storing at least a piece of reference pack header information that conforms to a specific standard;

packet header detecting means for detecting a packet header placed at the head of each packet contained in each of the plurality of packs based on the pack header information extracted by said pack header information extracting means;

means for checking whether an error occurs in the pack header information extracted by said pack header information extracting means, for retrieving a piece of reference pack header information that mostly conforms to the specific standard from said pack header information database if the extracted pack header information has an error, and for replacing the extracted pack header information having an error with the reference pack header information that mostly conforms to the specific standard to enable said packet header detecting means to detect the packet header;

packet header information extracting means for extracting packet header information contained in the packet header;

coded data extracting means for separating a coded data region from each packet based on the packet header information extracted by said packet header information extracting means, and for extracting coded data from the coded data region; and decoding means for decoding the coded data extracted by said coded data extracting means.

2. The decoding device according to claim 1, further comprising: a packet header information database for storing at least a piece of reference packet header information that conforms to the specific standard; and means for checking whether an error occurs in the packet header information extracted by said packet header information extracting means, for retrieving a piece of reference packet header information that mostly conforms to the specific standard from said packet header information database if the extracted packet header information has an error, and for replacing the extracted packet header information having an error with the reference packet header information that mostly conforms to the specific standard to enable said coded data extracting means to extract the coded data.

3. The decoding device according to claim 1, further comprising: coded-data-specific information extracting means for extracting coded-data-specific information other than the coded data, which is associated with the coded data, from the coded data region separated by said coded data extracting means; a coded-data-specific information database for storing at least a piece of reference coded-data-specific information that conforms to the specific standard; and means for checking whether an error occurs in the coded-data-specific information extracted by said coded-data-specific information extracting means, for retrieving a piece of reference coded-data-specific information that mostly conforms to the specific standard from said coded-data-specific information database if the extracted coded-data-specific information has an error, and for replacing the extracted coded-data-specific information having an error with the reference coded-data-specific information that mostly conforms to the specific standard to enable said decoding means to decode the coded data.

4. The decoding device according to claim 1, further comprising: a packet header information database for storing at least a piece of reference packet header information that conforms to the specific standard; means for checking whether an error occurs in the packet header information extracted by said packet header information extracting means, for retrieving a piece of reference packet header information that mostly conforms to the specific standard from said packet header information database if the extracted packet header information has an error, and for replacing the extracted packet header information having an error with the reference packet header information that mostly conforms to the specific standard to enable said coded data extracting means to extract the coded data; coded-data-specific information extracting means for extracting coded-data-specific information other than the coded data, which is associated with the coded data, from the coded data region separated by said coded data extracting means; a coded-data-specific information database for storing at least a piece of reference coded-data-specific information that conforms to the specific standard; and means for checking whether an error occurs in the coded-data-specific information extracted by said coded-data-specific information extracting means, for retrieving a piece of reference coded-data-specific information that mostly conforms to the specific standard from said coded-data-specific information database if the extracted coded-data-specific information has an error, and for replacing the extracted coded-data-specific information having an error with the reference coded-data-specific information that mostly conforms to the specific standard to enable said decoding means to decode the coded data.

5. A decoding device for extracting coded data from a sequence of data that forms a hierarchy in which each of a plurality of packs includes at least a packet and each packet includes coded data within a coded data region thereof, said device comprising:

pack header detecting means for detecting a pack header placed at the head of each of the plurality of packs;

pack header information extracting means for extracting pack header information contained in the pack header detected by said pack header detecting means;

packet header detecting means for detecting a packet header placed at the head of each packet contained in each of the plurality of packs based on the pack header information extracted by said pack header information extracting means;

packet header information extracting means for extracting packet header information contained in the packet header;

a packet header information database for storing at least a piece of reference packet header information that conforms to a specific standard;

coded data extracting means for separating a coded data region from each packet based on the packet header information extracted by said packet header information extracting means, and for extracting coded data from the coded data region;

means for checking whether an error occurs in the packet header information extracted by said packet header information extracting means, for retrieving a piece of reference packet header information that mostly conforms to the specific standard from said packet header information database if the extracted packet header information has an error, and for replacing the extracted packet header information having an error with the reference packet header information that mostly conforms to the specific standard to enable said coded data extracting means to extract the coded data; and decoding means for decoding the coded data extracted by said coded data extracting means.

6. The decoding device according to claim 5, further comprising coded-data-specific information extracting means for extracting coded-data-specific information other than the coded data, which is associated with the coded data, from the coded data region separated by said coded data extracting means; a coded-data-specific information database for storing at least a piece of reference coded-data-specific information that conforms to the specific standard; and means for checking whether an error occurs in the coded-data-specific information extracted by said coded-data-specific information extracting means, for retrieving a piece of reference coded-data-specific information that mostly conforms to the specific standard from said coded-data-specific information database if the extracted coded-data-specific information has an error, and for replacing the extracted coded-data-specific information having an error with the reference coded-data-specific information that mostly conforms to the specific standard to enable said decoding means to decode the coded data.

7. A decoding device for extracting coded data from a sequence of data that forms a hierarchy in which each of a plurality of packs includes at least a packet and each packet includes coded data within a coded data region thereof, said device comprising:

pack header detecting means for detecting a pack header placed at the head of each of the plurality of packs;

pack header information extracting means for extracting pack header information contained in the pack header detected by said pack header detecting means;

packet header detecting means for detecting a packet header placed at the head of each packet contained in each of the plurality of packs based on the pack header information extracted by said pack header information extracting means;

packet header information extracting means for extracting packet header information contained in the packet header;

coded data extracting means for separating a coded data region from each packet based on the packet header information extracted by said packet header information extracting means, and for extracting coded data from the coded data region;

coded-data-specific information extracting means for extracting coded-data-specific information other than the coded data, which is associated with the coded data, from the coded data region separated by said coded data extracting means;

a coded-data-specific information database for storing at least a piece of reference coded-data-specific information that conforms to a specific standard;

decoding means for decoding the coded data extracted by said coded data extracting means; and means for checking whether an error occurs in the coded-data-specific information extracted by said coded-data-specific information extracting means, for retrieving a piece of reference coded-data-specific information that mostly conforms to the specific standard from said coded-data-specific information database if the extracted coded-data-specific information has an error, and for replacing the extracted coded-data-specific information having an error with the reference coded-data-specific information that mostly conforms to the specific standard to enable said decoding means to decode the coded data.

8. A decoding method for extracting coded data from a sequence of data that forms a hierarchy in which each of a plurality of packs includes at least a packet and each packet includes coded data located within a coded data region thereof, said device comprising the steps of:

pack header detection for detecting a pack header placed at the head of each of the plurality of packs;

pack header information extraction for extracting pack header information contained in the pack header detected by said pack header detection step;

storing, in a pack header information database, at least a piece of reference pack header information that conforms to a specific standard;

packet header detection for detecting a packet header placed at the head of each packet contained in each of the plurality of packs based on the pack header information extracted by said pack header information extraction step;

checking whether an error occurs in the pack header information extracted by said pack header information extraction step, retrieving a piece of reference pack header information that mostly conforms to the specific standard from said pack header information database if the extracted pack header information has an error, and replacing the extracted pack header information having an error with the reference pack header information that mostly conforms to the specific standard to enable said packet header detection step to detect the packet header;

packet header information extraction for extracting packet header information contained in the packet header;

coded data extraction for separating a coded data region from each packet based on the packet header information extracted by said packet header information extraction step, and extracting coded data from the coded data region; and decoding the coded data extracted by said coded data extraction step.

9. The decoding method according to claim 8, further comprising the steps of:

storing, in a packet header information database, at least a piece of reference packet header information that conforms to the specific standard; and checking whether an error occurs in the packet header information extracted by said packet header information extraction step, retrieving a piece of reference packet header information that mostly conforms to the specific from said packet header information database if the extracted packet header information has an error, and replacing the extracted packet header information having an error with the reference packet header information that mostly conforms to the specific standard to enable said coded data extraction step to extract the coded data.

10. The decoding method according to claim 8, further comprising the steps of:

storing, in a coded-data-specific information database, at least a piece of reference coded-data-specific information that conforms to the specific standard;

coded-data-specific information extraction for extracting coded-data-specific information other than the coded data, which is associated with the coded data, from the coded data region separated by said coded extraction step;

checking whether an error occurs in the coded-data-specific information extracted by said coded-data-specific information extraction step, retrieving a piece of reference coded-data-specific information that mostly conforms to the specific standard from said coded-data-specific information database if the extracted coded-data-specific information has an error, and replacing the extracted coded-data-specific information having an error with the reference coded-data-specific information that mostly conforms to the specific standard to enable said decoding step to decode the coded data.

11. The decoding method according to claim 8, further comprising the steps of:

storing, in a packet header information database, at least a piece of reference packet header information that conforms to a specific standard;

checking whether an error occurs in the packet header information extracted by said packet header information extraction step, retrieving a piece of reference packet header information that mostly conforms to the specific standard from said packet header information database if the extracted packet header information has an error, and replacing the extracted packet header information having an error with the reference packet header information that mostly conforms to the specific standard to enable said coded data extraction step to extract the coded data;

coded-data-specific information extraction for extracting coded-data-specific information other than the coded data, which is associated with the coded data, from the coded data region separated by said coded data extracting means;

storing, in a coded-data-specific information database, at least a piece of reference coded-data-specific information that conforms to the specific standard; and checking whether an error occurs in the coded-data-specific information extracted by said coded-data-specific information extraction step, retrieving a piece of reference coded-data-specific information that mostly conforms to the specific standard from said coded-data-specific information database if the extracted coded-data-specific information has an error, and replacing the extracted coded-data-specific information having an error with the reference coded-data-specific information that mostly conforms to the specific standard to enable said decoding step to decode the coded data.

* * * * *